United States Patent [19]
Von Kulmer

[11] 3,780,448
[45] Dec. 25, 1973

[54] APPARATUS FOR DRYING WASHED VEHICLES

[75] Inventor: Ulrich Von Kulmer, Friedberg, Germany

[73] Assignee: Kleindienst & Co., Augsburg, Germany

[22] Filed: June 28, 1971

[21] Appl. No.: 157,088

[30] Foreign Application Priority Data
June 26, 1970 Germany............... P 20 31 556.4

[52] U.S. Cl..................................... 34/229, 34/222
[51] Int. Cl............................................. F26b 19/00
[58] Field of Search................. 34/54, 222, 229, 34/223, 239, 225, DIG. 13, 232, 233; 15/405, DIG. 2, DIG. 7; 134/123; 239/184, 185, 209

[56] References Cited
UNITED STATES PATENTS

| | | |
|---|---|---|
| 2,413,937 | 1/1947 | Zademach et al.................. 34/229 |
| 2,137,104 | 11/1938 | Zademach........................... 34/229 |
| 3,442,027 | 5/1969 | Hurwitz............................... 34/229 |
| 3,323,228 | 6/1967 | Maxwell............................... 34/229 |
| 3,224,108 | 12/1965 | Flaming............................... 34/229 |

Primary Examiner—John J. Camby
Assistant Examiner—James C. Yeung
Attorney—Karl F. Ross

[57] ABSTRACT

The invention relates to apparatus for the drying of vehicles, comprising at least one blast nozzle mounted on a rocking lever and including an element capable of following the contour of a vehicle surface during relative movement between the vehicle and the apparatus, the rocking lever being mounted on a swivel pivot connected to drive means, so that the swivel pivot is moved in a direction to decrease effectively the rate of relative movement between the vehicle and nozzle during a drying operation on at least one inclined surface of the vehicle.

7 Claims, 9 Drawing Figures

Ulrich von Külmer
INVENTOR

BY Karl G. Ross
Attorney

PATENTED DEC 25 1973

Ulrich von Külmer
INVENTOR

BY Karl J. Ross
Attorney

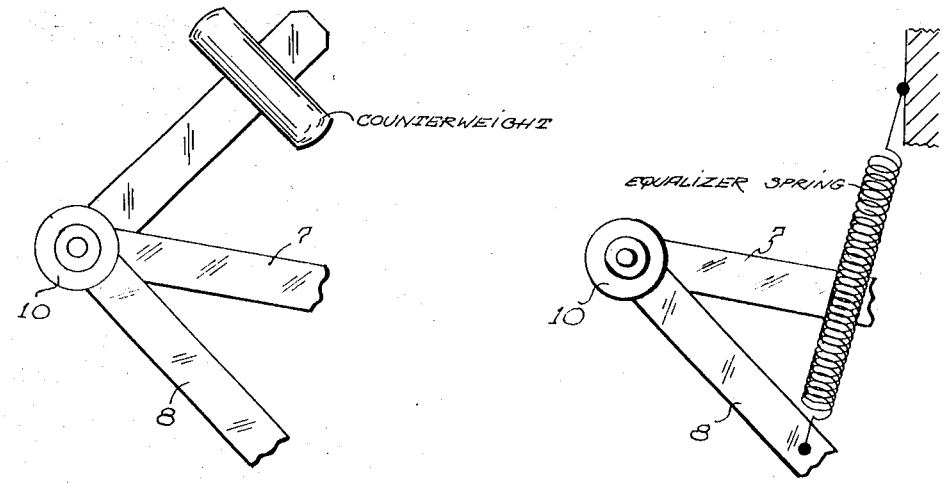
FIG. 7
FIG. 8
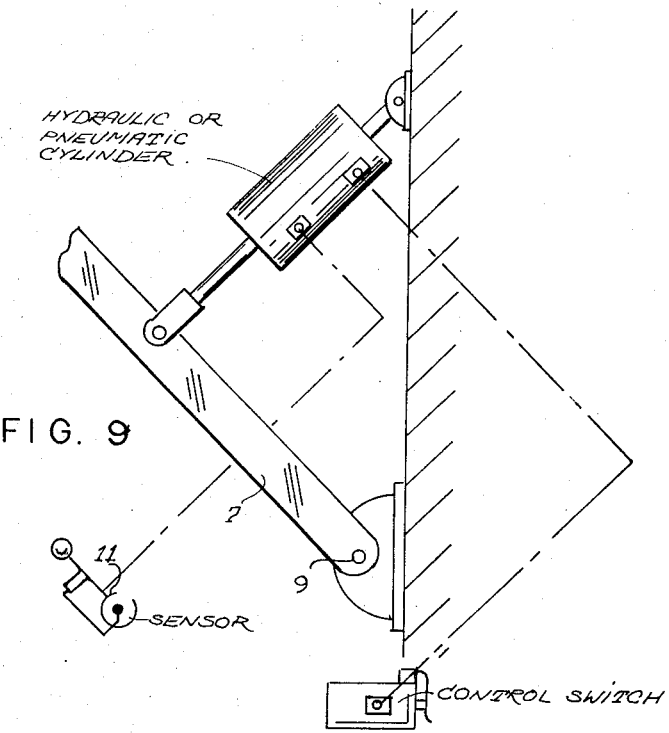
FIG. 9

APPARATUS FOR DRYING WASHED VEHICLES

SPECIFICATION

1. Field of the Invention

The invention relates to an apparatus for the drying of vehicles. The apparatus comprises at least one blast nozzle, which is mounted on a rocking lever and which is pressed against the surface of a vehicle during a relative movement between the vehicle and the drying apparatus, the blast nozzle being supported by the vehicle by means of a scanning element, and the relative movement being slowed down during the drying of the surface of at least one end window.

2. Background of the Invention

The drying of vehicles involves the problem of maintaining a substantially constant transit or processing time, that is to say of avoiding loss of time and nevertheless improving the drying effect. This is particularly so during drying of inclined surfaces such as front and rear windows of a vehicle.

In order to achieve this, it is known to decrease the rate of relative movement between the vehicle and the nozzle unit during the drying of at least one of the end, that is front and rear, windows, the extent of the delay being compensated at another position during drying. Thus such equilization has been accomplished by accelerating the rate of relative movement during the treatment of the roof surfaces.

One known apparatus suitable for carrying out this method consists, for example, of a parallelogramatic linkage connected to a drive by which a stretching movement of the linkage is produced. This apparatus enables a blast nozzle drying the vehicle to be moved across the roof surface at a rate exceeding the rate of feed of the vehicle with simultaneous bending of the parallelogramatic linkage, which is a rocking-lever joint.

The nozzle unit is thus maintained in readiness. As soon as one of the end windows reaches the zone of the nozzle unit, the rocking-lever joint is stretched so that the movement of the nozzle unit is retarded and thus the unit remains in the zone of the end window for an extended period of time with a resultant slowing-down of the relative movement between the nozzle unit and the vehicle.

In this construction, the delay is thus compensated by an accelerated treatment of the roof.

OBJECTS OF THE INVENTION

It is an object of the invention to obtain similar results, that is to say an improved drying of the windows, upon normal treatment of the remaining areas of the vehicle, that is to say including the normal treatment of the roof, and, in addition, considerably to simplify the apparatus.

SUMMARY OF THE INVENTION

The invention provides a pivot or bearing of the rocking lever actuated by a drive acting at substantially rignt angles to the direction of movement of the vehicle or of the nozzle. The drive moves the bearing or pivot in the direction of the vehicle as the nozzle moves along the rear zone of the vehicle and returns the nozzle when it is disposed between two vehicles.

It is yet another feature of the invention to provide that the nozzle is directed into the space between two consecutive vehicles passing through the drying apparatus and swung towards the next vehicle for the next drying operation. Therefore there is a certain lead for the treatment of the front end window thus obtained.

Moreover, the apparatus produces a certain amount of lag for the treatment of the rear window. The total distance covered resulting from this lead and lag is added during the drying of the front and rear end windows.

In one advantageous construction, the nozzle may extend across the width of the vehicle, which nozzle is supplied with air through flexible hoses.

In another embodiment, a pivotable or hinged blast nozzle may be provided. The bearing for the hinged blast nozzle may consist of a pair of rocking levers one of which, a guide lever, is mounted on an arch-like frame so as to be locally rotatable. It may be swung up or down by a motor drive at right angles or at substantially right angles to the direction of movement of the vehicle. It will be understood that a straight guide may also be used for the performance of this movement.

A rocking lever, to which the nozzle is secured, may also be hinged to the free end of the guide lever. The movement of the rocking lever may be produced simply by scanning the contours of the vehicle. For this purpose, the blast nozzle is provided with two rubber rollers by which it is, in addition, ensured that a constant distance between the nozzle and the vehicle is maintained. The weight of the nozzle may be balanced largely by counter-weights or by springs.

The nozzle enables the change in direction of the nozzle blast necessary for obtaining a satisfactory drying effect in the drying of vehicles (German Federal Patent Specification No. 1,246,445 ) to be obtained without additional means having to be provided.

With the aid of apparatus of this kind, the space between a dried vehicle and the next vehicle may be used for swinging the blast nozzle towards the next vehicle when the drying of the preceding vehicle is complete. This swivelling motion may be produced by swinging the guide lever, mounted on the arch, upwards and holding it in position by motor power. The guide lever is not swung downwards to treat the reat window until shortly before drying of the roof is complete. Preferably the rocking lever and the guide lever may form an acute angle when they are in their normal position, in which the blast nozzle and the bearing or pivot of the guide lever are close together and in which the bearing is drawn froward in the direction of the vehicle to be dried.

It will be understood that the pivotable mounting of the blast nozzles between two vehicles to be dried and the swivelling motion during the drying process may also be applied to side nozzles thus affording the advantage that the end and side surfaces are dried particularly intensitively at the optimum angle of incidence.

DESCRIPTION OF THE DRAWING

One embodiment of the invention is diagrammatically illustrated, by way of example, in the accompanying drawing, in which:

FIG. 7 is a fragmentary view of the device provided with a counterweight;

FIG. 8 is another detail view wherein a coil springs provides the counter force;

FIG. 9 is a detail view of a system provided with a pneumatic cylinder.

SPECIFIC DESCRIPTION

Figure 1:
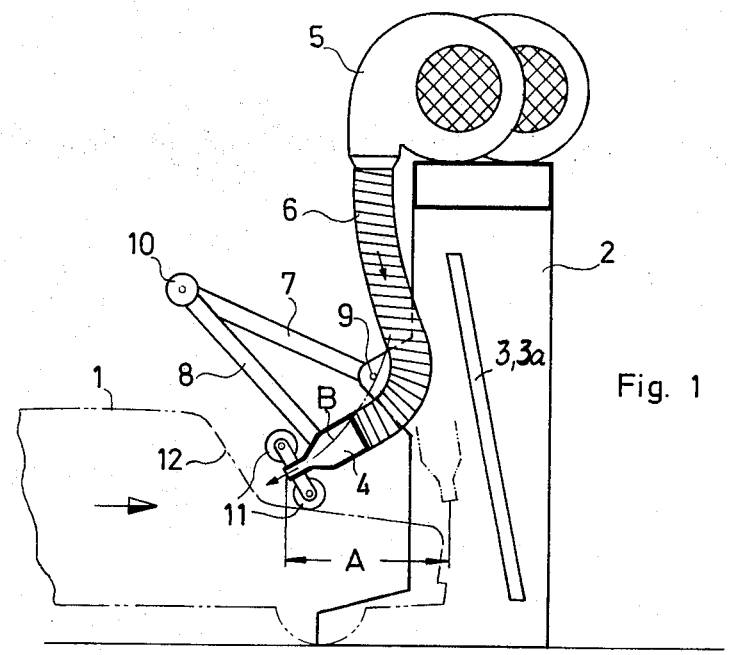
FIG. 1 is a cross-section through a drying apparatus during the treatment of the front end window of a vehicle.

Referring to the drawings it is assumed that a vehicle 1 is moved through a drying apparatus which may form, for example, a component part of a so-called "washing road". However, the invention does not exclude the reverse operation, in which the vehicle remains stationary and the drying apparatus is moved from one end of the vehicle to the other.

The drying apparatus comprises an arch-like frame 2 with one built-in nozzle 3 on the right-hand side and another built-in nozzle 3a on the left-hand side, and a blast nozzle 4 scanning the contour of the vehicle, which nozzle extends across the whole width of the vehicle 1. The blast nozzle 4 is supplied with air by blowers 5 through flexible hoses 6.

The blast nozzle 4 is pivotable by means of a guide lever 7 and a rocking or toggle lever 8. The guide lever 7 is mounted so as to be rotatable in a bearing 9 provided on the frame 2. The rocking lever 8 is pivotable in a swivel bearing 10 provided on the guide lever 7. The blast nozzle 4 is rigidly secured to the free end of the rocking lever 8. The blast nozzle 4 carries, in addition, a scanning element capable of following the contour of the vehicle in the form of two feeler rolls 11 made of rubber or other soft material.

The total weight of the nozzle is balanced by a counter-weight (FIG. 7) or by equalizer springs (FIG. 8) (not shown) provided on the rocking lever 8. The counter-weight (FIG. 7) or the equalizer springs (FIG. 8) are adjusted so that the blast nozzle 4 is drawn lightly downwards with its scanning element 11 resting on the respective surface of the vehicle, the blast nozzle 4 thus describing a path of motion along the vehicle 1 as the vehicle 1 undergoes relative movement with the frame 2.

Figure 5:
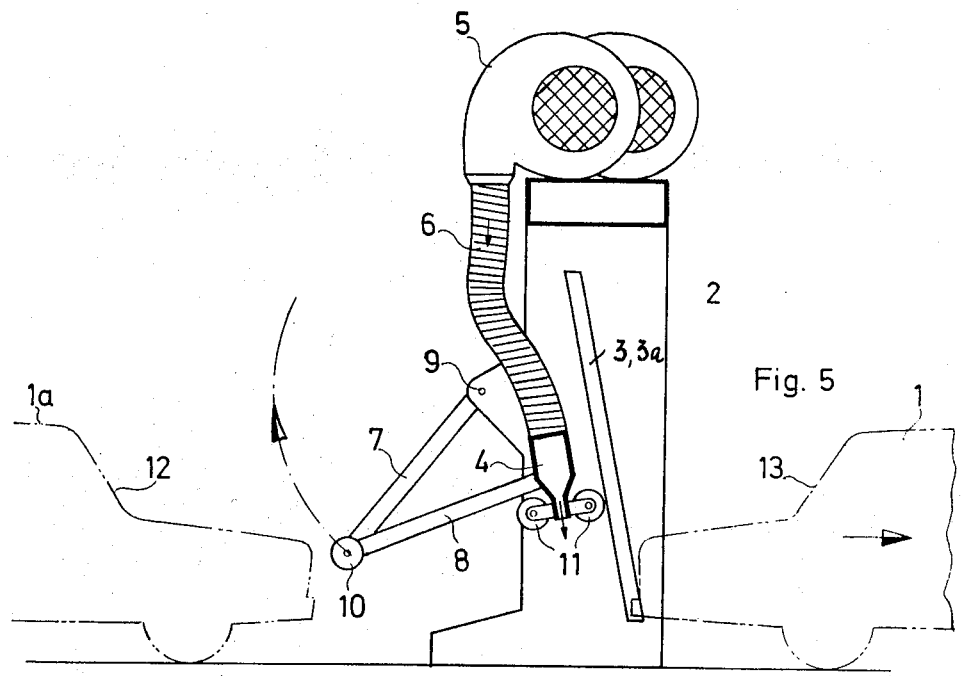
FIG. 5 is a cross-section according to FIGS. 1 to 4, in which the nozzle is in its final position after completion of the drying operation.
Figure 6:
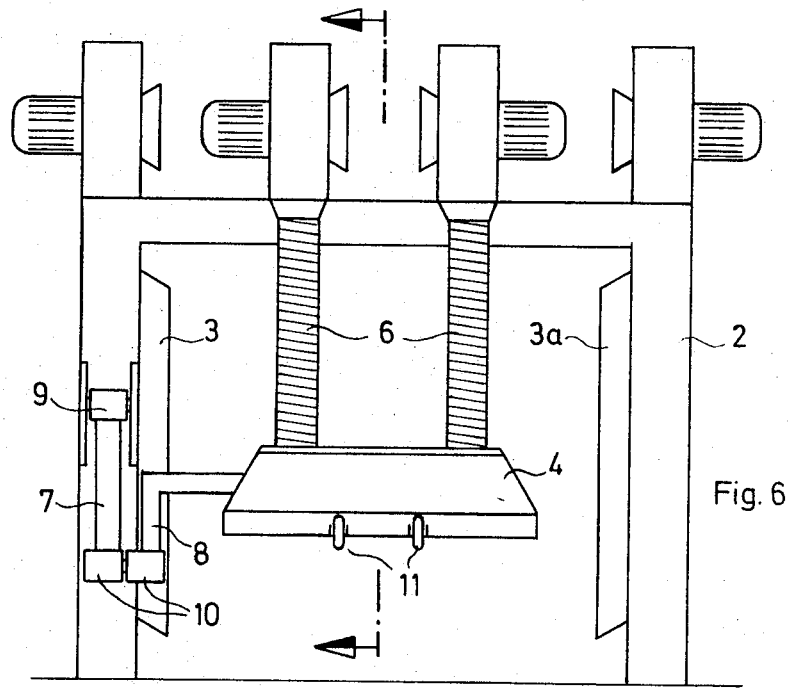
FIG. 6 is a frontal elevational view of the drying apparatus.

Upon completion of the drying operation of one vehicle the blast nozzle 4 is in the position shown in FIG. 5. The space between the dried vehicle 1 and a newly arriving vehicle 1a (FIG. 5) is used for swinging the blast nozzle 4 towards the newly arriving vehicle 1a. This is carried out by swiveling the guide lever 7 upwards in the direction of the arrow shown in FIG. 5. The guide lever 7 is then in the position shown in FIG. 1. The guide lever 7 is held in this position. The drive for the upward swing of the guide lever 7 is advantageously produced by motor power, for example, by a hydraulic or pneumatic cylinder (FIG. 9), which may be controlled, for example, by a control switch (FIG. 9) operated by the incoming vehicle, which switch triggers the initiation of the rotating motion or swing.

The blast nozzle 4 has thus been swung towards the incoming vehicle to the extent of the distance A indicated in FIG. 1.

The rocking lever 8 is freely rotatable in the pivot bearing 10, and the feeler rolls 11 together with the blast nozzle 4 are enabled to adjust themselves to the contours of the vehicle at a substantially constant distance therefrom while directing the blast nozzle in a direction advantageous for the drying operation.

When the feeler rolls 11 contact the inclined front window 12 of the vehicle, the blast nozzle 4 is swung back, describing the curve B shown in FIG. 1. The blast nozzle is thus delayed for an extended period of time forwardly of the front view 12 with the result that the drying effect is improved.

Figure 2:
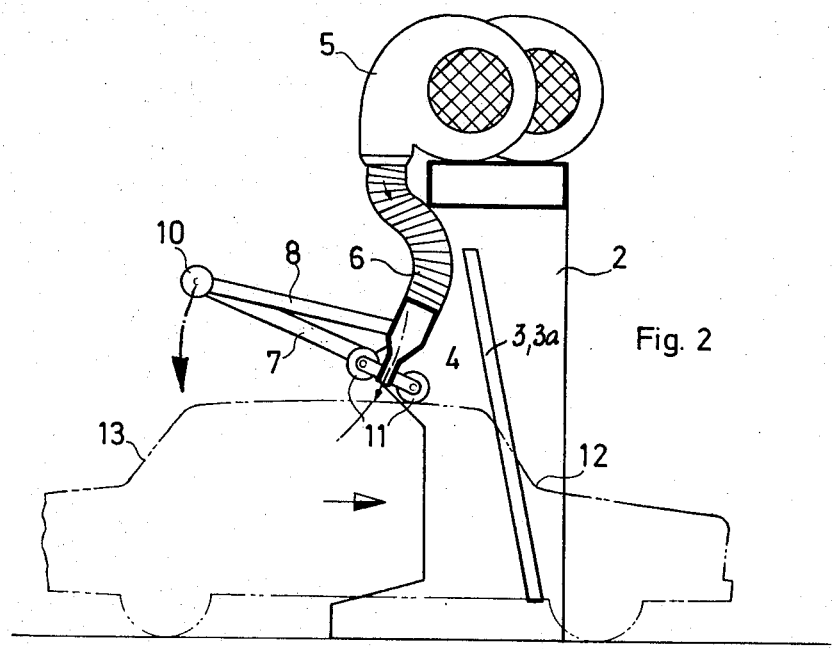
FIG. 2 is a corresponding cross-section during the treatment of the roof surface.

FIG. 2 illustrates the drying of the roof of a vehicle. Here also, the swiveling system produces automatically an advantageous angular position of the blast nozzle 4 which is thus enabled to dry the moisture present on the surface of the vehicle.

Figure 3:
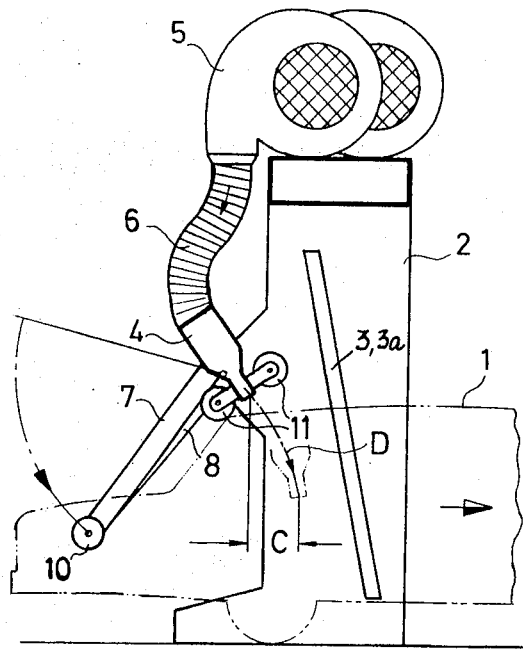
FIG. 3 is a cross-section according to FIGS. 1 and 2 during the treatment of the rear window.

Shortly before the drying of the roof is complete, the guide lever 7 is swivelled by motor power (not shown) in the direction of the arrow shown in FIG. 3 and the nozzle unit performing its relative movement across the surface of the roof is thus moved to a position in which it can be moved by the rocking lever 8 with delay relatively to the vehicle. The lagging distance C and the lagging curve D of the nozzle 4 are shown in FIG. 3.

Figure 4:
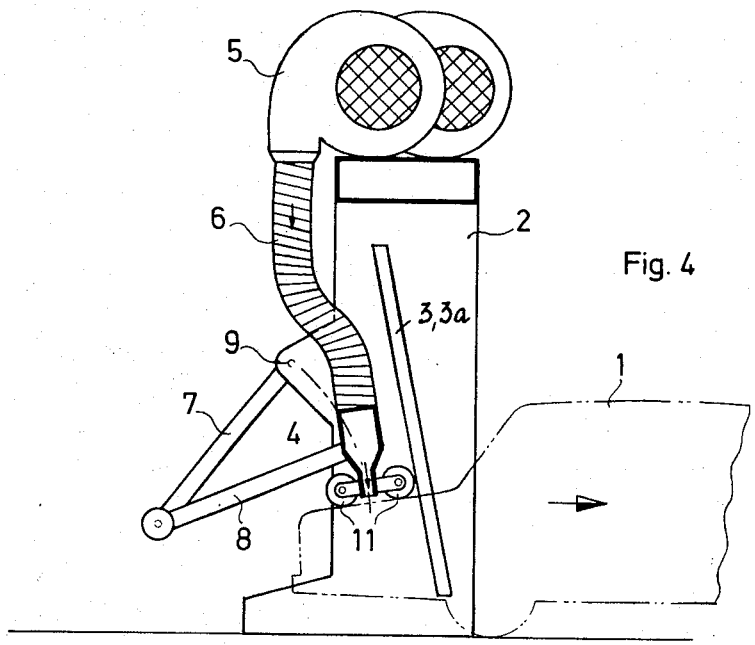
FIG. 4 is a cross-section according to FIGS. 1 and 3 during the treatment of the rear part of a vehicle.

FIG. 4 shows the nozzle 4 drying the rear part or trunk of the vehicle, the feeler rolls being in contact therewith to maintain the nozzle the required distance from the trunk surface.

The position of the nozzle 4 on completion of a drying operation of the vehicle 1 is shown in FIG. 5, the vehicle to be cleaned subsequently being indicated at 1a.

I claim:

1. An apparatus for the drying of a vehicle, comprising:
    frame means for defining a path for a vehicle to be dried;
    a first arm pivotally connected to said frame means at one of the ends of said arm;
    a second arm articulated to the other end of said first arm;
    a blast nozzle rigidly connected to said second arm at a location thereof remote from its articulation to said first arm;
    means for supplying a drying gas to said nozzle for direction thereby onto the surface of a vehicle traversing said path;
    sensing means on said second arm responsive to the contour of said vehicle for enabling said nozzle to follow said contour upon relative movement of said vehicle and said frame; and
    drive means on said frame for controlling the movement of at least one of said arms for decreasing the relative displacement of said nozzle and said vehicle along at least one surface of said contour inclined to the direction of displacement of said vehicle.

2. The apparatus defined in claim 1 wherein said drive means is operatively connected to at least one of said arms for shifting said second arm in the direction of movement of the nozzle along the rear part of said vehicle and returning said nozzle to an initial position when said nozzle is disposed between successive vehicles.

3. The apparatus defined in claim 2 wherein said drive means is operatively connected to said first arm.

4. The apparatus defined in claim 3 wherein said arms form an acute angle in a normal position wherein said nozzle and said pivot means are disposed close together and the articulation of said arms lies relatively forwardly in the direction of the vehicle to be dried.

5. The apparatus defined in claim 4 wherein said drive means is a cylinder.

6. The apparatus defined in claim 5 wherein said sensing means includes a pair of rollers disposed on opposite sides of said nozzle, one of said rollers being located relatively upstream of said nozzle and the other being located relatively downstream thereof with respect to the direction of travel of said vehicle.

7. The apparatus defined in claim 1, further comprising a flexible hose connecting said nozzle to the means for supplying gas thereto.

* * * * *